July 3, 1945.  W. P. MASON  2,379,819
FREQUENCY MODULATOR
Original Filed March 7, 1941  3 Sheets-Sheet 1
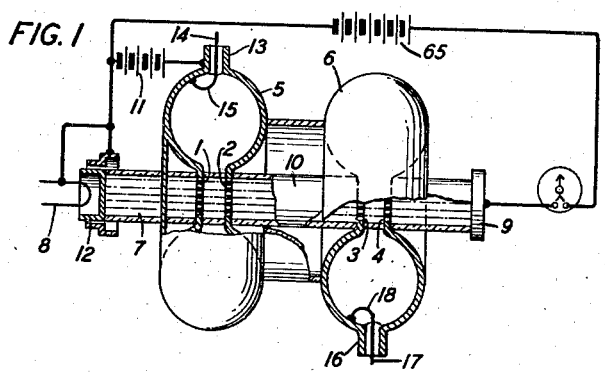
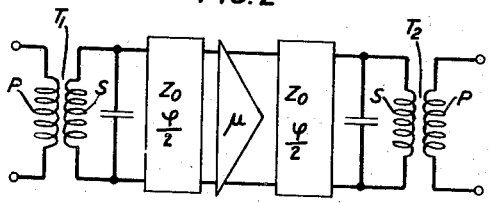
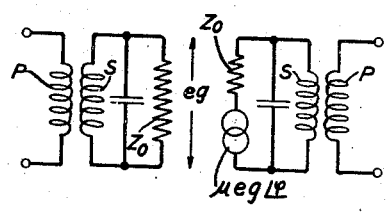
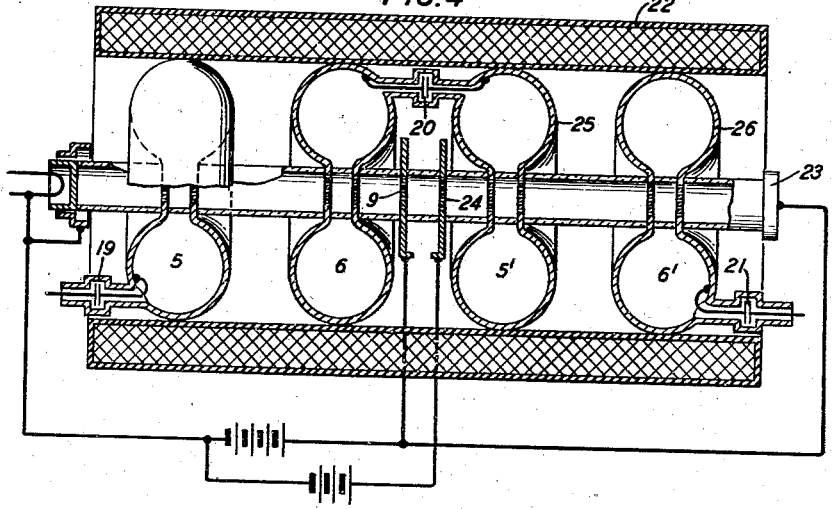
INVENTOR
W. P. MASON
BY
Franklin Mohr
ATTORNEY July 3, 1945.                    W. P. MASON                    2,379,819
                              FREQUENCY MODULATOR
                   Original Filed March 7, 1941    3 Sheets-Sheet 2

INVENTOR
W. P. MASON
BY Franklin Mohr
ATTORNEY

July 3, 1945.   W. P. MASON   2,379,819
FREQUENCY MODULATOR
Original Filed March 7, 1941   3 Sheets-Sheet 3

INVENTOR
W. P. MASON
BY
Franklin Mohr
ATTORNEY

Patented July 3, 1945

2,379,819

UNITED STATES PATENT OFFICE 2,379,819

FREQUENCY MODULATOR

Warren P. Mason, West Orange, N. J., assignor to Bell Telephone Laboratories, Incorporated, New York, N. Y., a corporation of New York Original application March 7, 1941, Serial No. 382,180. Divided and this application March 28, 1942, Serial No. 436,703

6 Claims. (Cl. 315—6)

This invention relates to apparatus in which a wave guide or resonator is associated with an electron stream to enable an electromagnetic field which may be set up in the wave guide or resonator to induce a variation in some characteristic property of the electron stream.

In particular, it relates to means and methods for improving the coupling between an excitation system and an electron stream in such manner as to enable the impressed field to induce a current or density variation in the electron stream by accelerating and decelerating, or bunching, the electrons in a more efficient manner than heretofore.

In accordance with the invention, the impedance attributable to the wave guide or resonator is to be substantially matched by the impedance of the electron stream. The result of such an improved impedance match is a more efficient transfer of energy and power between the excitation means and the electron stream. The meaning to be attributed to the term "impedance of the electron stream" will become more apparent in what follows but may be briefly defined as the ratio between the voltage set up by the field and the resultant current developed in the electron stream by the action of the field.

The present application is a division of a copending application, Serial No. 382,180, filed March 7, 1941, and is directed to a variable frequency oscillator, or frequency modulating system, using broad band coupling circuits and a low impedance electron stream.

Various systems have been proposed wherein an electron stream usually in the form of a beam and initially of uniform density is set up by means of an electron gun or other means together with focussing or collimating means. Density variations are thereafter impressed upon the electron stream or beam by the action of an electromagnetic field arranged to act upon the stream between two closely spaced transverse planes in the stream. As a practical matter the field is generally set up in a resonator and produces a voltage between a pair of grids or screens or other electron permeable electrodes in the path of the electron stream. The resonator may be considered in many respects analogous to a parallel tuned circuit in which the gap between the above-mentioned electrodes corresponds to the usual condenser across which a periodic difference of potential is developed. The effective impedance of such a circuit at resonance is well known to be approximately L/CR where L is the lumped inductance, C the lumped capacitance, and R the resistance. In any event, the voltage which appears across the electrodes of the resonator may be treated as the voltage of a generator of a certain internal impedance, determined by the structure and damping of the resonator.

In a device of the kind being considered, the voltage generated by the resonator is employed to bunch electrons in the electron stream. Actually, the electrons of the stream are acted upon by the resonator substantially only while in the space between the two electrodes. The initial speed of the electrons and the spacing of the electrodes are usually so adjusted that the transit time of an electron between the electrodes is a small fraction of the cyclic time of an oscillation of the resonator. In particular, if an electron were subject to the field for more than half the cycle, it will be noted that the effect of the field upon the electron in the second half cycle would partially or completely nullify the effect of the first half cycle. When the transit time is a small fraction of the cycle, an electron is accelerated, decelerated, or left substantially unaccelerated, according to the portion of the cycle during which it traverses the gap between the electrodes of the resonator. The actual amount of acceleration or deceleration effected is small, due to the small transit time, so the electrons leave the gap at only slightly different speeds and are still nearly as uniformly spaced as they were initially, for there has not been time for any noticeable drifting apart. However small the bunching that has been effected, its presence is significant with regard to the problem of impedance matching. It is evident that any small degree of bunching that occurs between the electrodes represents the equivalent of a small current at the operating frequency. This current is produced by the operation of the voltage generated in the resonator. This voltage in producing a relatively small current is evidently working into a relatively high impedance. The impedance so determined is what has above been defined as the impedance of the electron stream. The well-known principles of energy and power transfer require that the impedance of the electron stream be matched to the impedance of the generator, in this case the resonator, in order that maximum power may be transferred from the generator to the electron stream.

In accordance with the invention, an impedance match between the resonator and the electron stream may be promoted in several ways.

In the ordinary practical case in the present state of the art the impedance of the electron stream is likely to be rather large in comparison with the impedance of the resonator. The impedance of the electron stream has been seen to be a measure of the amount of density variation effected in the electron stream during the passage of the stream between the electrodes of the resonator. The interaction may be very brief and thus result in a very small density change. A negligible density change represents the extreme case of a substantially infinite impedance value for the electron stream. The resonator, on the other hand, is always dissipative to some extent, and the dissipative losses necessarily bring down the effective impedance of the resonator by increasing the value of R. Consequently, in the absence of predesign the electron stream impedance is most likely to be too large and the resonator impedance too small, thereby precluding a substantial impedance match.

The impedance of the electron stream is fundamentally a matter of the efficiency of control over the electron stream by a voltage impressed upon the electrodes placed in the path of the stream. The effectiveness of the control is dependent upon the strength of field set up by the voltage between the electrodes and the transit time of the electron in the region containing the field. The field strength in turn depends upon the electrostatic capacity between the electrodes. Thus the impedance of the electron stream may be decreased by making the grind-like electrodes of the resonator cover a larger area of the stream, or, in other words, by making smaller the holes in the resonator through which the electron stream passes. Conversely, the stream impedance may be made larger by decreasing the area of the electrodes.

Another way in which the control of the effective electron current by the impressed voltage may be changed is by changing the initial current in the electron stream. By increasing the initial current in the electron stream the given voltage is effective upon a greater number of electrons, a greater amount of bunching occurs, and the current caused by the given impressed voltage is increased. The initial electron current may of course be increased by increasing the emission from the electron gun or other source of electrons employed.

Various expedients are available for varying the impedance of the resonator. One is to adjust the separation between the grids. The impedance of the resonator may be increased by increasing the separation of the grids. Another expedient is to use a double field grid as described by Hahn and Metcalf in an article entitled, "Velocity modulated tubes," in Proceedings of the Institute of Radio Engineers, February, 1939, page 106. In this case a transit angle, preferably of value $\pi$ is to be allowed for the two grid systems.

It may readily be shown that it is possible to decrease the electron stream impedance by increasing the area of the grids and at the same time to increase the impedance of the resonator by increasing the separation of the grids and thus to improve the impedance match between the electron stream and the resonator. It would be equally feasible to increase the impedance of the electron stream and decrease the impedance of the resonator if the case required.

A further feature of the invention is the use of a condenser in series with the resonator to secure a broader band of transmitted frequencies than is obtainable with the resonator alone. Realization of substantially the full transmission band of the coupling circuit is assured by means of impedance matching.

Another feature is the utilization of a single electron stream in more than one stage of amplification with provision for erasing the density modulations and velocity modulations of one stage from the stream before the next stage of amplification is begun. The wave to be amplified is reintroduced through high frequency coupling circuits.

In the drawings:

Fig. 1 is a schematic representation of an electron velocity modulation system arranged as an amplifier;

Fig. 2 is an equivalent circuit of the system of Fig. 1 with respect to the transmission of high frequency waves;

Fig. 3 is another equivalent circuit of the system of Fig. 1 for high frequencies, a modified form of the circuit of Fig. 2;

Fig. 4 is a schematic representation of a multistage, broad-band amplifier structure;

Figure 5A:
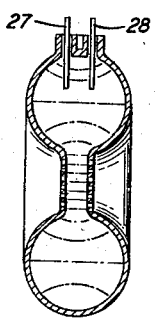
Fig. 5A is a cross-sectional view of a rhumbatron type resonator showing electrostatic exciting means and including a diagrammatic indication of the presence of a standing wave inside the resonator.

Referring to Fig. 1, which shows in schematic representation an amplifier of the velocity modulation type, 10 is an evacuated envelope passing through the perforated reentrant portions 1, 2 and 3, 4, respectively of a pair of rhumbatrons or resonators 5 and 6. An electron stream in the form of a beam indicated at 7 is caused to pass down the tube from an electron gun 8 or other suitable means to a collector electrode 9 by the action of a battery 11, the latter providing an accelerating potential difference between the electron gun and the resonators, which are conductively connected together. A battery 65 connected between the cathode and electrode 9 also supplies an accelerating potential and assists in the collection of electrons at the electrode 9. The electron stream is guided and collimated into the beam form by means of a focussing electrode or ring 12 which also acts to prevent dispersion of electrons in the beam. A transmission line with outer conductor 13 and inner conductor 14 forms a means for introducing into the resonator 5 a high frequency wave to be amplified. The inner conductor 14 is formed into a loop 15 inside the resonator, which loop is inductively related to the curved inner conducting surface of the resonator. Another transmission line with outer conductor 16, inner conductor 17 and coupling loop 18 is provided for taking output from resonator 6.

The system of Fig. 1 operates in the manner of the Klystron described in an article entitled, "A high frequency oscillator and amplifier," by R. H. and S. F. Varian, in the Journal of Applied Physics, vol. 10, p. 321, May 1939. The beam 7 of electrons upon reaching grid 1 is of substantially uniform density and the electrons of the beam travel initially with substantially equal velocities. The beam is directed straight along the axis of the tube or envelope under the collimating action of the focussing electrode 12. A wave to be amplified, introduced into resonator 5 by means of loop 15 sets up electromagnetic waves in the interior of the resonator 5 and these periodically establish a high potential difference between the grids 1 and 2, alternating in polarity.

During the portion of the high frequency cycle when the grid 2 is positive with respect to the grid 1, the electromagnetic field produced by the grids is of such polarity as to aid the motion of the electrons from the electron gun 8 toward the collector 9. The electrons situated between the grids 1 and 2 are accelerated by the field produced by the resonator and kinetic energy is stored in the electrons. The accelerated electrons begin to gain upon those ahead and thus tend to create a non-uniform density of electrons in the stream.

During the portion of the high frequency cycle when the grid 2 is negative with respect to the grid 1, the field produced by the resonator is in such direction to oppose their motion, thus slowing them down with the result that the field absorbs energy from the electrons.

The electrons thus slowed down are gained upon by the next group of accelerated electrons, resulting in a tendency to group or bunch the electrons. The energy which the field of the resonator delivers to the electrons by accelerating them during one half cycle is mostly returned to the field during the succeeding half cycle when other electrons are slowed down by the field. The reaction of the electron stream upon the resonator is thus seen to be mainly a non-dissipative one, which must be reflected to the resonator in the form of a reactive impedance.

The precise nature of the energy transfer between the generator and the electron stream will be shown more clearly by the following considerations. Suppose the electron stream to be composed of charges uniformly spaced and all traveling with the same speed and in the same direction as they pass the first electrode. Between the first and second electrodes the stream is subjected to the field of the resonator. Suppose time is reckoned from an instant when the field has reversed from a direction in which it tended to retard the electrons to a direction in which it tends to accelerate them. If a voltage that accelerates electrons is taken to be positive, then the second electrode is, at the instant that we start to count time, passing through zero to a positive potential with respect to the first electrode and the resonator voltage may be represented by a sine wave with positive coefficient. The instant of the passage of this sine wave through the zero value from negative to positive value is substantially simultaneous with a maximum of electron concentration midway between the first and second electrodes. This may be readily verified by considering that previous to this instant the electrons that passed the first electrode were slowed down and from then on the electrons are being accelerated. At a slightly later instant these electrons will be arriving at the second electrode somewhat bunched together because some of the faster ones behind have overtaken slower ones ahead. The moving of a bunch of electrons into the neighborhood of the second electrode will result in a compensatory current in the resonator 5, equivalent to a movement of electrons from the second electrode to the first electrode. In terms of conventional currents, this is a positive current from the first to the second electrode within the resonator. In other words the current is at a positive maximum at substantially the instant when its driving electromotive force is turning from a negative to a positive value. The current is a cosine wave with positive coefficient, and as related to the driving force, is therefore identified as a capacitive current, leading the electromotive force in phase.

The object of employing the resonator is to alternately store energy in and withdraw energy from the electrons of the beam, and it was seen above that the energy exchange between the resonator and the beam is analogous to the exchange of energy between a source and a condenser. In the case of the condenser the storage of energy is accompanied by the concentration of charges upon the plates. In the case of the resonator and electron beam the concentration of charge is in the space in the neighborhood of the second grid of the resonator. Maximum power storage occurs in a condenser charged by a generator of given internal resistance when the reactance of the condenser is matched to the internal resistance of the generator.

Analogously in the case of coupling the resonator to the electron stream, the maximum power storage in the stream is attainable when the internal impedance of the resonator is matched to the impedance of the stream.

After the electrons pass grid 2 they continue to bunch together in alternate regions or planes and to spread apart in between. Proper choice of the distance from grid 2 of the first resonator to grid 3 of the second resonator will permit a maximum of bunching as is well known in this art. The space between grid 2 and grid 3 is commonly referred to as the "drift space." The wave arriving at grid 3 is then an amplified copy of the wave leaving grid 2 except that the wave form may be somewhat distorted. A phase difference appears between the waves at grid 2 and grid 3 dependent upon the time of transit of the electrons between the two grids. Amplification results from the transfer of some of the energy of the initially uniform electron stream into alternating current energy by virtue of the bunching of the electrons. The transfer follows from changes in the velocity of individual electrons by interaction with the resonator 5. As some electrons are accelerated and others decelerated, very little net expenditure of energy is required to start the bunching operation, which accentuates itself as the electrons move along the drift space.

The bunches of electrons, in passing through the space between grid 3 and grid 4, induce a wave in the resonator 6 in the usual manner for apparatus of this type. Due to the increased bunching of the electrons effected during their passage through the drift space, the wave induced in resonator 6 is of considerably greater amplitude than the original wave set up in resonator 5. Efficient transfer of energy and power between the electron stream and resonator 6 again calls for a substantial impedance match between the electron stream and the resonator. It will be evident that the impedances will be substantially the same here as at the junction of the electron stream with the resonator 5, due to considerations of symmetry and reciprocity of currents and voltages.

Fig. 2 shows the equivalent circuit of the system of Fig. 1 for the high frequency wave to be amplified. The coupling loop 15 is represented by a primary winding P. The resonator 5 is represented by a secondary winding S, coupled to P, together with a shunt condenser. The reaction of the electron stream is represented by a transmission line having a surge impedance $Z_0$. The amplifying effect of the drift space is represented by a one-way amplifier having the amplification factor $\mu$. For simplicity and without loss of generality, the amplifying effect is treated as being concentrated at the center of the drift space, the latter having a total phase shift of $\phi$ degrees, but if desired the amplifying effect might be treated as being spread uniformly along the length of the drift space. The resonator 6 will, from conditions of symmetry and reciprocity, evidently be equivalent to the same combination of impedances as the resonator 5 and is accordingly represented by another parallel combination of a condenser and a second coil S. The coupling loop 18 is represented by a second coil P.

It will be readily recognized that reactions in the drift space are substantially one way in nature, due to the one-way direction of the electron stream itself. While changes in electron concentration are carried along in the stream and accentuated in the direction from the electron stream toward the collector, changes are in general in no way communicated in the reverse direction. The representation of the amplifier in Fig. 2 as a one-way device is thus warranted. Hence the impedance terminating the input tuned circuit will be the characteristic impedance $Z_0$ of the line as shown in the left-hand portion of Fig. 3. If the voltage developed across this impedance is designated $e_g$ as in Fig. 3, then the magnitude of the voltage generated at the output end of the drift space is $\mu e_g$. This voltage will be the open circuit voltage of the line and will work through the characteristic impedance $Z_0$. The voltage will differ from $e_g$ by the phase angle $\varphi$. The circuit of Fig. 2 is thus analyzed into two sections as shown in Fig. 3, each section being effectively a tuned transformer circuit terminated by an impedance $Z_0$, which may be designated the characteristic impedance of the electron stream.

Considering now the band width which the structure of Fig. 1 is capable of transmitting, an examination of the equivalent circuit, Fig. 2 or Fig. 3, shows that the band width transmitted is limited by the inherent band width of the coupling circuits. Within this limit the impedance termination plays a part. For uniform transmission over the complete band, the terminating impedance $Z_0$ should match the characteristic impedance of the coupling circuit. For maximum transmission at a given frequency of course, the same impedance match is required. Considering the whole band, if the terminating impedance is too low the transmission tends to be peaked in a band narrower than the band width peculiar to the coupling unit. If the terminating impedance is too high, two peaks of maximum transmission will be developed, one above and one below the center of the band.

Figure 11:
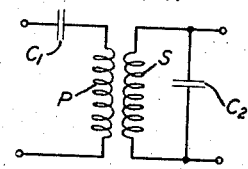
Fig. 11 is a schematic representation of a coupling circuit having an inherently broader transmission band than the coupling circuits shown in Figs. 2 and 3.

When a broader transmission band is desired the result may be secured by choosing coupling circuits that have inherently broader transmission bands. The breadth of transmission band of a coupling circuit is ordinarily measured by the separation in frequency between the transmission peaks which the circuit is capable of developing. In general the separation depends upon the coefficient of coupling $k$. Where $f_1$ and $f_2$ represent the peak frequencies, the ratio of $f_2$ to $f_1$, denoted F, is an index of the band width of the circuit. For the simple form of coupling circuit shown in Figs. 2 and 3, it has been found that $$F = \frac{f_2}{f_1} = \frac{1}{\sqrt{1-k^2}} \doteq 1 + \frac{1}{2}k^2$$

which indicates that for small values of coupling such as are ordinarily used the band width is relatively small. A slightly more complex coupling circuit is readily formed by adding a series condenser in the primary circuit as shown in Fig. 11, the result being a circuit in which, for small coupling values, the band width increases proportionally to the coupling instead of as the square of the coupling. The corresponding formula is:

$$F = \frac{f_2}{f_1} = \frac{2 - k^2 + k\sqrt{4 - 3k^2}}{2(1-k^2)} \doteq 1 + k$$

Numerical calculations show that for a coupling value of $k=0.1$, for example, the band width factor F for the simple circuit of Figs. 2 and 3 is 1.005 while the value of F for the circuit of Fig. 11 is 1.1. Assuming an operating mean frequency of 100 megacycles the band width in the first example is 500,000 cycles per second and in the second example 10,000,000 cycles per second. Other things being equal, the impedance looking into the circuit of Fig. 11 is lower than that looking into the circuit of Figs. 2 or 3 because of the series condenser.

The particular methods and means for adjusting the impedance of a given resonator and a given electron stream to effect any desired degree of impedance match between said impedances are illustrated diagrammatically in Figs. 8A, 8B, 9A, 9B, 10A and 10B.

Figure 8A:
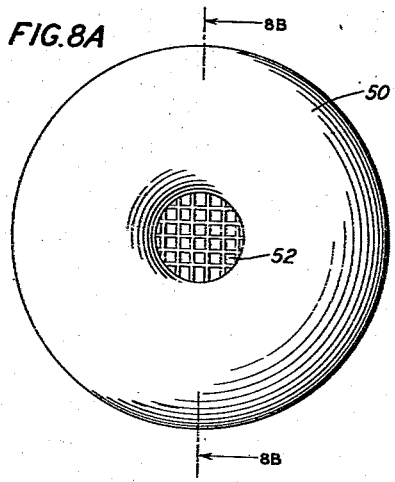
Fig. 8A is an elevation and Fig. 8B a cross-sectional view of a rhumbatron type resonator with relatively open mesh grids, an associated electron stream of a given average density being indicated diagrammatically in Fig. 8B.
Figure 8B:
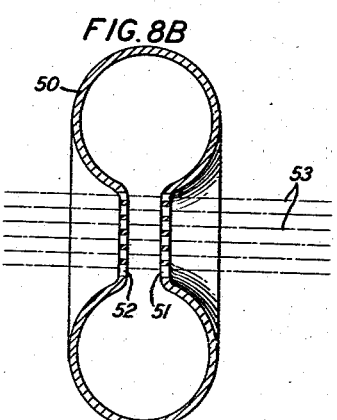

Fig. 8A shows an elevation of a resonator of the rhumbatron type and Fig. 8B shows the same in cross-section along the line B—B' indicated in Fig. 8A. The resonator is shaped somewhat like a hollow toroid with a central reentrant portion comprising a pair of grids or screens or perforated sheets. Any other suitable arrangement for passing electrons while substantially preventing escape of electromagnetic radiation may be employed instead of the grids illustrated. The toroidal section is shown at 50 and parts of the grids at 51 and 52. The electron stream is indicated by parallel lines at 53. The resonator is such as may be used either as resonator 5 or resonator 6 in the system of Fig. 1.

Figure 9A:
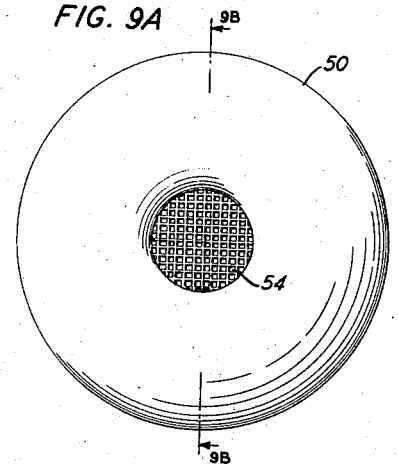
Fig. 9A is an elevation and Fig. 9B a cross-sectional view of a resonator like that of Figs. 8A and 8B but modified by increasing both the grid area and the grid spacing to provide an improved impedance match.
Figure 9B:
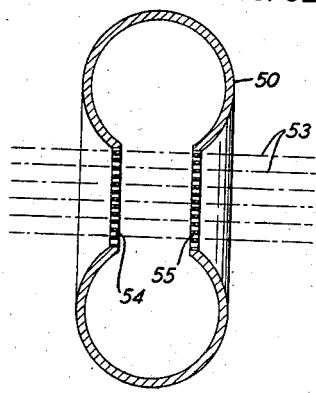
Figure 10A:
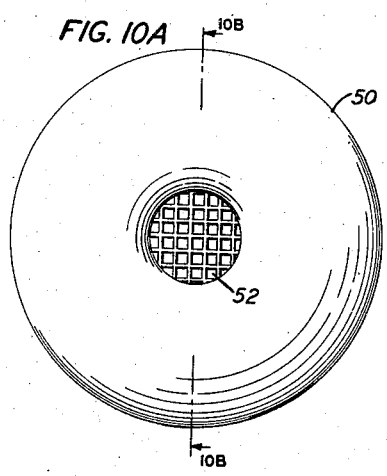
Figs. 10A and 10B are the same as Figs. 8A and 8B respectively except that a denser electron stream is employed to provide an improved impedance match.
Figure 10B:
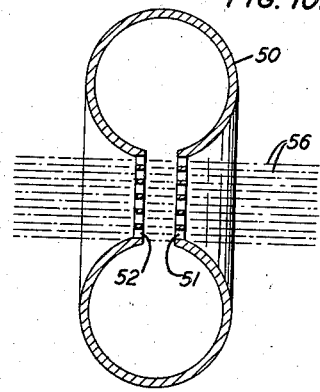

Fig. 9A is an elevation of another rhumbatron resonator and Fig. 9B the corresponding cross-section. Here the grids 54 and 55 are shown spaced further apart than the corresponding grids 51 and 52 in Fig. 8B. This change gives the resonator of Figs. 9A and 9B a higher effective impedance as a resonator than is the case in the resonator of Figs. 8A and 8B. In addition, the grids 54 and 55 are of finer mesh than grids 51 and 52. Other things being equal, the grids 54 and 55 exert a greater control upon the electron stream than do the grids 51 and 52. The result is a lower value of the characteristic impedance of the electron stream. Under suitable circumstances then, a resonator may be designed with moderately separated, open meshed grids as in Figs. 8A and 8B or with farther separated closer meshed grids as in Figs. 9A and 9B or other combination to effect any desired degree of impedance matching effect between the resonator and the electron stream. Alternatively, the electron flow in the electron stream may be changed, as in Fig. 10B where a greater electron flow is indicated by more closely drawn parallel lines at 56 compared with the lines 53 in Fig. 8B. The effect of increasing the rate of electron flow is to decrease the impedance of the electron stream and such decrease may be employed instead of, or in conjunction with, employing a close mesh grid as was shown in Figs. 9A and 9B.

Figure 12:
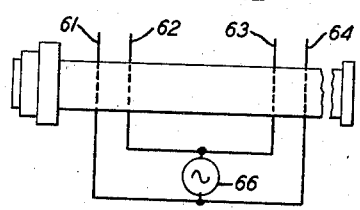
Fig. 12 is a diagrammatic representation of a double grid scheme which is applicable for effecting a lowered value of the impedance of an electron srteam.

The impedance of the electron stream may also be controlled by using the arrangement of Hahn and Metcalf above referred to, in which the two grids 1 and 2 are replaced by four grids 61, 62, 63 and 64 as in Fig. 12. The second and third grids 62 and 63 are connected together, and likewise grids 61 and 64. The exciting voltage is impressed between the grid system 61, 64 and the grid system 62, 63 by a suitable generator 66. The transit time of an electron from grid 61 to grid 62, and from grid 63 to grid 64 is in both cases preferably very small compared to the transit time from grid 62 to grid 63. The transit time between grid 62 and grid 63 is preferably one-half cycle of the impressed alternating voltage. Since the arrangement of the grids and the connection of the generator is such that the voltage drop from grid 61 to grid 62 is always the reverse of that from grid 63 to grid 64, an electron which receives an acceleration, for example, in traveling between 61 and 62 will receive another equal acceleration in traveling from 63 to 64. A similar state of affairs exists for electrons that pass grid 61 at such time as to be retarded by the field. The device of the two pairs of grids properly spaced, as taught by Hahn and Metcalf, is thus seen to be effective to produce twice as much bunching of electrons with a given generator voltage as will be obtained with a single pair of grids. The combination gives one-half of the impedance of the electron stream that is obtained with the single pair of grids. Thus the arrangement may be made use of in a system embodying the present invention where it is desired to reduce the impedance of the electron stream.

The best proportions for a resonator in any given case may be most readily found by trial. The proportions for impedance matching should usually be such as to provide impedances of the same order of magnitude and beyond that the exact value will ordinarily not be very critical. Resonator 6 should usually be proportioned the same as resonator 5. As a matter of refinement, an exact impedance match may be approached as closely as circumstances require or conditions permit.

Fig. 4 shows a two-stage amplifier employing a single electron stream and broad band coupling circuits. The arrangements are generally similar to those shown in Fig. 1 except that four resonators are provided instead of two and certain additional elements are provided. Series coupling condensers are shown at 19, 20 and 21 and a long focusing coil at 22. Anodes are provided at 9 and 23 and following the anode 9 a retarding electrode 24 is inserted, at the potential of the cathode or differing from that potential by a small amount. The action of the first two resonators is similar to that of the resonators in the system of Fig. 1. Resonator 5 impresses velocity variations upon the electron stream. Resonator 6 removes most of the variations from the electron stream, leaving mainly a steady flow of electrons uniformly spaced. The electrode 24 then reduces the speed of the electrons to a small value. Before reaching the third resonator the electrons are again speeded up by a potential applied to the second accelerator. The alternating output of the second resonator is supplied to the third resonator through a coupling circuit including the series condenser 20. Electrons are again bunched by the action of the third resonator and an amplified current is induced in the fourth resonator. The amplification for the two stages, expressed in decibels, may be expected to approach twice that for a single stage. The long focussing coil 22 acts to prevent diffusion of electrons away from the stream, which is in beam form, so that most of the electrons used in the first stage are also available in the second stage.

Figure 5B:
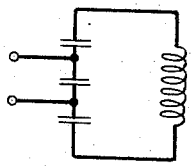
Fig. 5B is an equivalent circuit of the structure of Fig. 5A for high frequencies.

Fig. 5A shows a resonator excited by electrostatic means, shown as electrodes 27 and 28 instead of the electromagnetic means comprising the loop 15 of Fig. 1. The equivalent electrical circuit for this arrangement is shown in Fig. 5B. to effect a broadening of the transmission band analogously to that secured by using a series condenser in Fig. 11, a series inductance may be used. This may be an electrical coil in series with the driving electrodes.

Figure 6:
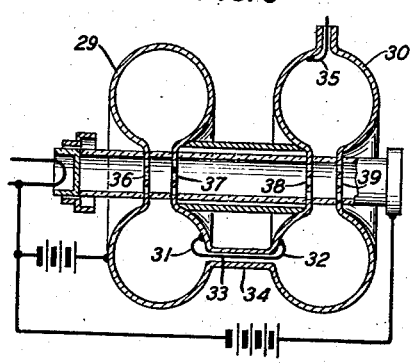
Fig. 6 is a schematic representation of an oscillator employing narrow band coupling circuits and open mesh grids, to promote constant frequency operation.

Fig. 6 shows an arrangement suitable for a constant frequency oscillator making use of the principles set down above. In this arrangement the input resonator 29 and output resonator 30 are coupled together by the combination of loops 31 and 32 and an interconnected transmission line with inner conductor 33 and outer conductor 34. The output is made available for outside connection by means of a loop 35. The grids 36, 37, 38 and 39 are of very open mesh. The arrangement is self-excited by means of the coupling between the resonators and operates as an oscillator in well-known manner. To promote constancy of frequency, the coupling circuits are chosen to be of the narrow band type as in Fig. 1 rather than the broad band type of Fig. 11. To narrow the band still further, the coupling between the resonators should be made small. In order to sustain the oscillations with the small coupling the reactance to resistance ratio or value of Q in the resonators should be kept as large as possible. A high value of Q is promoted by using the open mesh form of grid, thus giving a high impedance termination for the resonators. In general, those effects which narrow the band or raise the value of Q have the result of confining phase changes of the system mainly to a very narrow frequency band as well. Any voltage change which may for any reason occur in the system will tend to change the transit time for electrons traveling down the tube in the drift space. To make up for such a change in transit time the system will have to shift to a slightly different operating frequency, at which new frequency the phase shift in the resonators will compensate for the change in transit time.

In a narrow band, high Q circuit the change of phase with frequency takes place at a very high rate. Consequently, a given change in phase will require only a very slight change in operating frequency to effect its compensation. Hence the circuit is inherently one to promote constancy of frequency within close limits.

Figure 7:
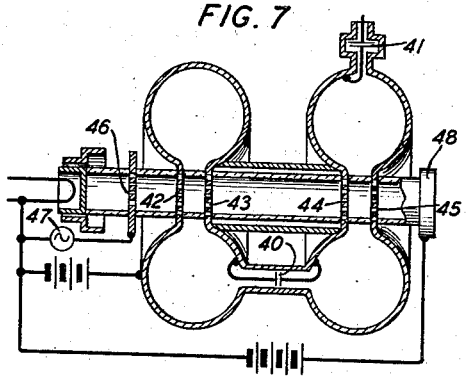
Fig. 7 is a schematic representation of an oscillator employing broad band coupling circuits and fine mesh grids, to enable operation over a wide band of frequencies as in a frequency modulation system.

Fig. 7 shows a system suitable for use in frequency modulation and is in some respects the converse of the system of Fig. 6. A broad band coupling is provided by the insertion of series condensers 40 and 41. The grids 42, 43, 44 and 45 are of a relatively close mesh, providing low impedance terminations. A control grid 46 is added and a source 47 of modulating potentials. Here a disturbing voltage is deliberately impressed upon grid 46 by means of source 47 for the purpose of changing the transit time and hence the operating frequency. Due to the wide band characteristic and the low values of Q employed, the system must make a relatively large frequency change to compensate for a given change in voltage. The voltage change may be impressed upon the control grid 46 as shown, or it might be impressed upon the collector 48.

While the invention has been illustrated by the showing of systems having resonators such as hollow bodies supporting standing waves interiorly, it will be appreciated that resonators of other types may be used, or wave guides of various types, and that traveling waves may be used instead of standing waves, if desired.

It is not intended that the invention be limited to the means and methods shown for controlling the impedance of the electron stream or the impedance of the resonator or wave guide, the means and methods shown being merely illustrative.

What is claimed is:

1. In a frequency modulating system, means to maintain an electron stream, a pair of hollow syntonous resonators each having two electron permeable electrodes situated in the path of said electron stream, said electron permeable electrodes being of relatively close mesh, means for coupling said resonators together to produce oscillations, a series condenser incorporated in said coupling means, and means for varying the electron transit time between said resonators in accordance with a signal wave to vary the frequency of the oscillations.

2. In a frequency modulation system, two syntonous resonant circuits, unidirectional coupling means connecting said circuits, said unidirectional coupling means being characterized by a finite transmission time, inductive feedback coupling means connecting said circuits to produce self oscillations in conjunction with said unidirectional coupling means, means to vary the transmission time of said unidirectional coupling means for the purpose of varying the frequency of the said self oscillations, and a condenser in series with said inductive feedback coupling means for increasing the degree of the said frequency variation corresponding to a given variation in said transmission time.

3. In a variable frequency generating system, two syntonous electric circuits, unidirectional coupling means connecting said circuits, inductive feedback coupling means connecting said circuits to promote self oscillations in conjunction with said unidirectional coupling means, a load circuit, inductive coupling means connecting one of said syntonous circuits to said load circuit, means to vary the frequency of said self oscillations, and a condenser in series with each of said inductive coupling means, to increase the degree of the said frequency variation resulting from a given operation of the said frequency varying means.

4. In a frequency modulating system, means to maintain an electron stream, two resonating chambers each having an electron permeable portion located in the path of said electron stream whereby the said stream may successively traverse both of said resonating chambers, inductive means for coupling said resonating chambers together to produce sustained oscillations, a condenser serially connected in circuit with said inductive means, and means for varying the frequency of said sustained oscillations.

5. In a frequency modulation system, means to maintain an electron stream, two resonating chambers each having electron permeable portions located in the path of said electron stream, inductive means for coupling said resonating chambers together, a condenser in series with said coupling means, an output circuit inductively coupled to one of said resonating chambers, a condenser serially connected in said output circuit, and means for varying the electron transit time in said electron stream in transit between said resonating chambers.

6. In a frequency modulating system, means to maintain an electron stream, means located in succession along the path of said electron stream including in order in the direction of motion of the electrons in said stream, an electrode for controlling the speed of the electrons, a pair of electron permeable electrodes, means defining a drift space, another pair of electron permeable electrodes and an electron collecting electrode, said first and second mentioned pairs of electron permeable electrodes being connected to syntonous resonators, inductive coupling means connecting said resonators, and a condenser serially connected to said coupling means.

WARREN P. MASON.